Feb. 14, 1967     E. W. BERNHAGEN     3,304,397
PRESSURE CONTROL ACTUATOR WITH SEAL-MOUNTED ELECTRICAL ELEMENT
Filed Nov. 23, 1964
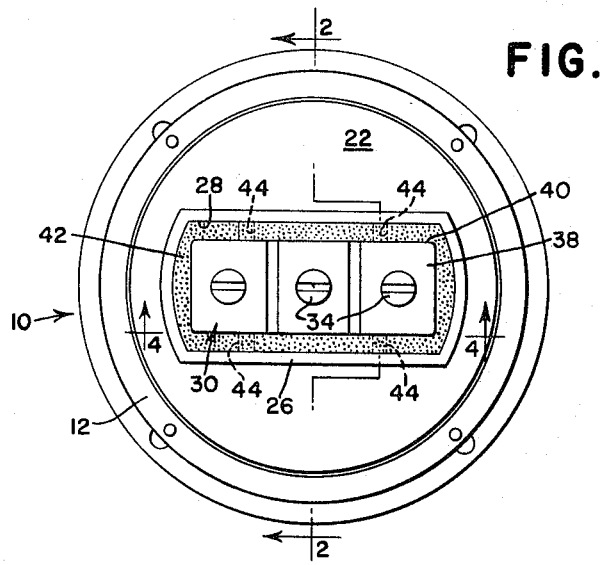
FIG. 1
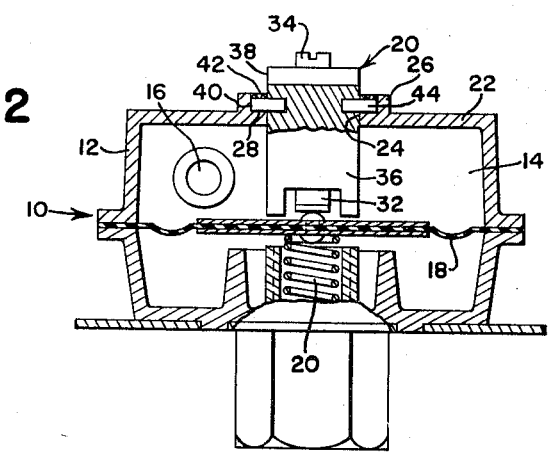
FIG. 2
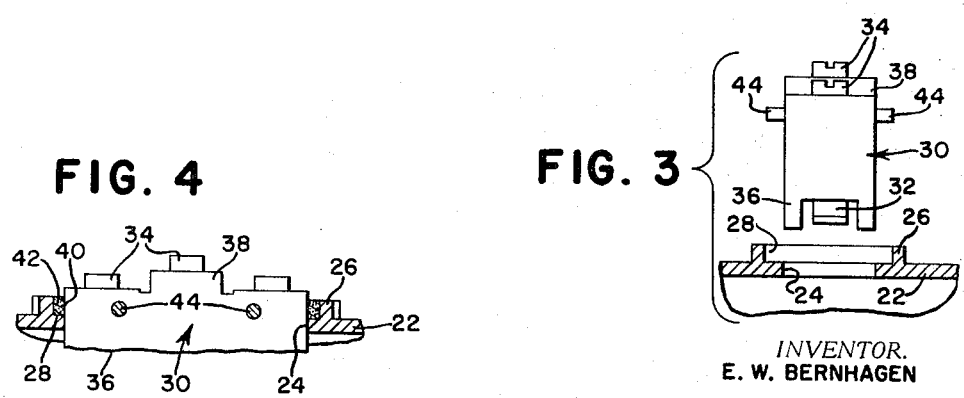
FIG. 4
FIG. 3
INVENTOR.
E. W. BERNHAGEN
BY
ATTORNEY

United States Patent Office 3,304,397
Patented Feb. 14, 1967

3,304,397
PRESSURE CONTROL ACTUATOR WITH SEAL-MOUNTED ELECTRICAL ELEMENT
Edwin W. Bernhagen, 2627 E. Hayes,
Davenport, Iowa 52803
Filed Nov. 23, 1964, Ser. No. 413,149
5 Claims. (Cl. 200—168)

This invention relates to a control element mounting and more especially to an improved mounting for an electrical switch of the encapsulated or unit type in wall means wherein a rigid, fluid-tight joint is desired between the wall means and the switch and wherein the switch is electrically connectible externally of the wall means, as where the wall means is part of a fluid-pressure-receivable casing.

A typical but not exclusive example of such environment is a pressure regulator having a casing defining a chamber enclosing a member that is movable in opposite directions according to the occurrence of fluid-pressure differentials, and the member, such as a diaphragm or piston, is used to open and close electrical contacts in a switch or the like. In the basic prior art, mechanical means are employed, such as a plunger or the like, extending through the casing wall and associated with suitable linkage, to transmit piston-induced forces to an electrical switch mounted on but externally of the casing. This design is complicated and expensive, because of the use of the intermediary linkage and the requirement for costly seals to accommodate the movable plunger, in addition to which further means must be used for mounting the switch on and outside the casing.

A principal object of the present invention is to eliminate these complications and costly design characteristics by mounting the switch, in unit or encapsulated form, within an opening in the wall means of the casing, utilizing internal parts of the switch as the means to receive piston or diaphragm forces and using the outer part of the switch, equipped with simple external electrical terminals as means to which appropriate circuit connections may be made. The switch is secured to the casing by a bead or fillet or equivalent peripheral quantity of sealing material applied about the junction of the switch and the opening. It is a further object to utilize material having cementitious as well as sealing qualities and thus the material performs the dual function of mounting as well as sealing the switch. It is a specific object to provide the wall means with a peripheral recess which combines with the external part of the switch element to afford a surrounding channel to which the material is easily applied. When the material, which may be a conventional epoxy or the like, sets up, a superior joint results. A still further object resides in equipping the element with lateral projecting means receivable in the channel to hold the element against relative displacement inwardly of the casing while the sealing and mounting material is applied, thus facilitating assembly and production.

The foregoing and other important objects and desirable features, inherent in and encompassed by the invention, will become apparent as a preferred embodiment of the invention is shown, by way of example, in the ensuing description and accompanying sheet of drawings, the figures of which are described next below.

FIGURE 1 is a plan view of the device.

FIGURE 2 is a section as seen generally along the line 2—2 of FIGURE 1.

FIGURE 3 is a fragmentary exploded view illustrating a phase in the assembly of the device.

FIGURE 4 is a fragmentary section taken on the line 4—4 of FIGURE 1.

The invention, although described in terms of a particular environment in which the features are specifically novel, is envisaged as having broader novelty and, therefore, the disclosure should be taken as representative rather than limiting.

The device illustrated is typical of a pressure regulator and has a casing 10 including wall means 12 defining a chamber 14 which is fluid-pressure-receivable, as by an inlet 16, to induce a pressure differential for causing movement of a piston or diaphragm 18, here biased in one direction by a coil spring 20. The casing is of two-part construction and the diaphragm is sandwiched between the two parts.

Considering the casing as usefully disposed in the position of FIGURE 2, it is seen as having a top wall portion 22 in which is formed a through-opening 24, here of rectangular shape. The casing may be typically a die casting and has an integral marginal or peripheral external rib means 26 offset laterally and marginally from the opening to provide a recess 28 bordering the opening. As best seen in FIGURE 1, the rib means is essentially rectangular, a design characteristic dictated here by the shape of a control element 30. Obviously, if the element were of different shape, the opening and rib means would be also.

The element 30 is of the encapsulated or unit type of electrical switch, commonly known as a "micro" switch, containing the usual internal electrical contacts (not shown) responsive to a switch arm 32 and typically connected to external terminals 34 to which circuit leads (not shown) may be appropriately attached. In brief, the element is enclosed in its own housing formed of molded insulating material and the arm 32 and terminals 34 are the only exposed parts. In the mounting arrangement here, the switch housing closely fits the opening and extends therethrough, placing an internal housing part 36 within the chamber 14 and an outer housing part 38, carrying and exposing the terminals 34, outside the chamber. In other words, the switch extends through the top wall portion 22 so that its switch arm is internally associated with or engageable by the diaphragm and its terminals are externally accessible for electrical connections. When the switch is disposed as stated above, its peripheral surfaces (here vertical) combine with the rib means 26 to convert the recess into a peripheral channel 40 that faces outwardly, here upwardly.

In assembly, the switch, after being thus positioned, is rigidly secured in place by securing means including filler material 42 of the cementitious, sealing type, such as any of the well-known epoxies, sometimes known in the trade as "potting" material. This material has the characteristics of being relatively fluid or viscous when applied, has good adhesive and dielectric qualities, is an excellent fluid seal, and hardens or sets up as a permanent bond or adhesive relatively quickly after application, thus rigidifying the element 30 with the casing. This material is easily applied to the recess or channel and adheres to all proximate surfaces, making the switch an "integral" part of the casing. The relatively close fit between the element 30 and the opening 24 prevents the material 42 from flowing into the chamber 14.

To facilitate assembly, the switch is provided with a plurality of lateral projections, shown here as cross pins 44, long enough to rest on the floor of the channel 40. These hold the switch against relative inward displacement while the potting material 42 is being applied; and, since they remain in place, they become an integrated part of the mounting means, being embedded in and adhered to the material.

The complete assembly is a compact, relatively inexpensive unit, incorporating the casing and electrical switch as virtually a one-piece item. The switch is sealed in place and is mounted against relative movement. Being enclosed itself, except for the arm 32 and terminals 34, its combination with the recess-received sealing or filler material completes the fluid-tight joint between it and the casing. There are no linkages, plungers, external moving parts and the like. The only exposed moving part is the arm 32, and this is sealed within the chamber 14. The only external exposed parts are the terminals 34 and these are internally sealed (not shown) and are movable only to the extent that they can be loosened and tightened as an incident to attachment of the electrical wires or leads. The seal afforded by the potting material 42 is the only switch-to-casing seal, and expensive O-rings and the like are not needed since there are no moving plungers, etc.

Features and advantages other than those outlined will become readily apparent to those versed in the art, as will numerous variations in the embodiment shown, all of which may be achieved without departure from the spirit and scope of the invention.

What is claimed is:

1. A device of the class described, comprising: a casing including wall means defining a fluid-pressure-receivable chamber enclosing an internal movable member, said wall means including a portion including an outer face and having a through-opening and said portion having therein in said outer face a peripheral externally facing recess bordering the opening and enlarging said opening in only the outer face of said portion; a control element relatively closely slidably fitting and extending through the opening and having an outer part externally of said wall portion outer face and surrounded by the recess and an inner part within the chamber and operatively associated with the movable member, said outer part and said recess cooperating to provide an external peripheral channel about said element; and means securing the element in place, including filler material contained within the channel and peripherally engaging the proximate peripheral portion of said outer part of the element in fluid-tight relation.

2. The invention defined in claim 1, in which: the filler material is of cementitious nature adhering to the element outer part and to the wall portion that defines the recess.

3. The invention defined in claim 1, in which the securing means includes lateral projections on the element outer part receivable in the channel and engaging the wall portion that defines the bottom of the recess to hold the element against relative inward displacement.

4. The invention defined in claim 3, in which: the filler material is of cementitious nature adhering to the element outer part, to the projections and to the wall portion that defines the recess.

5. The invention defined in claim 1, in which the wall means outer face has a peripheral rib means bordering the opening in marginally offset relation to the element outer part to combine with said outer part to provide said channel.

References Cited by the Examiner

UNITED STATES PATENTS

| | | | |
|---|---|---|---|
| 684,736 | 10/1901 | Wurts | 174—152 |
| 2,503,594 | 4/1950 | Phelps | 200—83 |
| 2,794,889 | 6/1957 | Bachman et al. | 200—168 |

ROBERT K. SCHAEFER, *Primary Examiner.*

KATHLEEN H. CLAFFY, *Examiner.*

H. O. JONES, *Assistant Examiner.*